United States Patent
Spath

(10) Patent No.: US 8,477,102 B2
(45) Date of Patent: Jul. 2, 2013

(54) INCREASING CONDUCTIVE POLYMER LIFE BY REVERSING VOLTAGE

(75) Inventor: Todd M. Spath, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 1297 days.

(21) Appl. No.: 11/386,997

(22) Filed: Mar. 22, 2006

(65) Prior Publication Data

US 2007/0222763 A1  Sep. 27, 2007

(51) Int. Cl.
*G06F 3/041* (2006.01)

(52) U.S. Cl.
USPC .................... 345/173; 345/176; 428/141

(58) Field of Classification Search
USPC ...... 345/212, 107, 173–179; 428/323; 326/57
See application file for complete search history.

(56) References Cited

U.S. PATENT DOCUMENTS

| | | | |
|---|---|---|---|
| 4,496,886 A | 1/1985 | Gordon et al. | |
| 4,827,085 A | 5/1989 | Yaniv et al. | |
| 5,504,323 A * | 4/1996 | Heeger et al. | 250/214.1 |
| 5,955,198 A * | 9/1999 | Hashimoto et al. | 428/414 |
| 5,965,901 A * | 10/1999 | Heeks et al. | 257/40 |
| 6,166,561 A * | 12/2000 | Fifield et al. | 326/57 |
| 6,469,267 B1 | 10/2002 | Welsh et al. | |
| 7,638,949 B2 * | 12/2009 | Hara et al. | 315/169.1 |
| 2002/0123209 A1 | 9/2002 | Yamada et al. | 438/432 |
| 2003/0170456 A1 * | 9/2003 | Anderson et al. | 428/403 |
| 2003/0170492 A1 * | 9/2003 | Anderson et al. | 428/690 |
| 2003/0218595 A1 * | 11/2003 | Eldon et al. | 345/107 |
| 2004/0001056 A1 * | 1/2004 | Atherton et al. | 345/212 |
| 2004/0178996 A1 * | 9/2004 | Kurashima et al. | 345/173 |
| 2004/0254513 A1 * | 12/2004 | Shang et al. | 604/5.01 |
| 2004/0263441 A1 * | 12/2004 | Tanaka et al. | 345/76 |
| 2005/0012465 A1 * | 1/2005 | Uchida | 315/169.3 |
| 2005/0061953 A1 * | 3/2005 | Huiberts et al. | 250/214.1 |
| 2005/0110766 A1 * | 5/2005 | Kent et al. | 345/173 |
| 2005/0118922 A1 | 6/2005 | Endo | |
| 2005/0219825 A1 | 10/2005 | Campini et al. | |
| 2005/0267264 A1 * | 12/2005 | Takei et al. | 525/242 |
| 2006/0147701 A1 * | 7/2006 | Lockridge | 428/323 |
| 2006/0226397 A1 * | 10/2006 | Chen et al. | 252/500 |

FOREIGN PATENT DOCUMENTS

| | | |
|---|---|---|
| EP | 0 321 084 | 6/1989 |
| EP | 0 499 012 | 8/1992 |
| EP | 1 465 145 | 10/2004 |
| GB | 2 095 891 | 10/1982 |
| JP | 62165633 A * | 7/1987 |
| WO | WO 90/03713 | 4/1990 |

OTHER PUBLICATIONS

U.S. Appl. No. 11/143,540, filed Jun. 2, 2005, Todd M. Spath et al.
U.S. Appl. No. 11/143,562, filed Jun. 2, 2005, Todd M. Spath et al.
U.S. Appl. No. 11/143,539, filed Jun. 2, 2005, Todd M. Spath et al.

* cited by examiner

*Primary Examiner* — Amare Mengistu
*Assistant Examiner* — Premal Patel
(74) *Attorney, Agent, or Firm* — Paul A. Leipold; J. Lanny Tucker

(57) ABSTRACT

The invention relates to a method of extending the life of conductive polymer in a device comprising providing conductive polymer, passing direct current through said polymer, and reversing the voltage gradient in the organic polymer conductor.

27 Claims, 15 Drawing Sheets

INCREASING CONDUCTIVE POLYMER LIFE BY REVERSING VOLTAGE

FIELD OF THE INVENTION

The present invention relates to extending the life of conductive polymers used in electrical or electronic devices. The invention involves drive elements and controlling conditions wherein the direction of the voltage gradient in the conductors is manipulated.

BACKGROUND OF THE INVENTION

Electrical devices such as displays, touch screens, heaters, bus bars, light sources, may contain a substrate provided with an indium tin oxide (ITO) layer as a transparent electrode. The coating of ITO is carried out by vacuum sputtering methods, which involve high substrate temperature conditions up to 250° C., and therefore, glass substrates are generally used. The high cost of the fabrication methods and the low flexibility of such electrodes, due to the brittleness of the inorganic ITO layer as well as the glass substrate, limit the range of potential applications. As a result, there is a growing interest in making all-organic devices, comprising plastic resins as a flexible substrate and carbon nanotube or organic electroconductive polymer layers as an electrode. Such plastic electronics allow low cost devices with new properties. Flexible plastic substrates can be provided with an electroconductive polymer layer by continuous hopper or roller coating methods (compared to batch process such as sputtering) and the resulting organic electrodes enable the "roll to roll" fabrication of electronic devices which are more flexible, lower cost, and lower weight.

Touch screens (also referred to as touch panels or touch switches) are widely used in conventional CRTs and in flat-panel display devices in computers and in particular with portable computers. FIG. 1 shows a typical resistive-type touchscreen 100 comprising a first electrode 120 that is on the side of the touchscreen that is nearer to the device that is referred herein below as the device side electrode and a second electrode 110 that is on the side of the touchscreen that is nearer to the user that is referred herein below as the touch side electrode. Device side electrode 120 comprises a transparent substrate, having a first conductive layer. Touch side electrode 110 comprises a transparent support, that is typically a flexible transparent support, and a second conductive layer that is physically separated from the first conductive layer by dielectric (insulating) spacer elements 30. The transparent substrate and support may be bonded together at their perimeter by adhesive 40 to make an assembly. The conductive layers have a sheet resistance selected to optimize power usage and position sensing accuracy. A voltage is developed across each of the conductive layers in turn by a controller (not shown). Deformation of the touch side electrode 110 by an external object such as a finger or stylus causes the second conductive layer to make electrical contact with first conductive layer, thereby transferring a voltage between the conductive layers. The magnitude of this voltage is measured by the controller through connectors 143, 144, 253, 254, connected via conductive patterns 145, 146, 255, 256, and metal bus bars 141, 142, 251, 252 formed on the edges of conductive layers, to locate the position of the deforming object.

FIG. 2 shows a 4-wire resistive touch screen configuration where the touch side 110 and device side 120 layers have been offset for clarity. The touch side layer has vertically arranged bus bars 141 and 142 which may be used to develop a voltage gradient in the horizontal direction, increasing in potential from left to right, by grounding the left bus bar 142 and raising the right bus bar 141 to the supply voltage (V+). Switching devices 301, shown as field effect transistors (FETs), are provided to selectively impose the voltage gradient or allow the bus bar potential to float, as determined by the gate level of the FET. Other switching devices, such as bipolar transistors, integrated circuit multiplexers, application specific integrated circuits (ASICs), relay contacts, and other devices known to a practitioner schooled in electronic circuit design may be used to accomplish the equivalent function.

A similar arrangement of horizontal bus bars 251 and 252 on the device side layer 120 along with switching devices 302, allow for a vertical voltage gradient, increasing in potential from top to bottom, to be created in that layer when the top electrode is grounded and the lower bus is raised to the (V+) potential via their respective switch devices.

The direct current power supply, switching devices, voltage measuring subsystems (not shown), and communication subsystems (not shown), in combination form a "controller" for the touch screen. The touch screen controller may also incorporate a microcontroller, microprocessor, analog multiplexer (MUX), analog to digital converter (ADC), digital signal processor (DSP) or other digital logic to control the various subsystems and coordinate the touch position measuring process.

The horizontal component of the two-dimension touch position is determined by applying logic levels to terminals "A", to place those switching devices in a conductive state, thus imposing the horizontal voltage gradient in the touch side electrode. The logic levels on terminals "B" place those switches in an off state, allowing the voltage of the device side electrode to be pulled to the local voltage at the point where it makes contact with the touch side electrode. The potential of the device side layer may be measured at either horizontal bus bar (terminal Sh 254 shown).

The vertical component of touch position is determined by applying logic levels to turn switches "A" in an off state and switches "B" in an on state, creating a vertical voltage gradient in the device side conductor. The voltage at the touch side electrode is then pulled to the local potential at the point of contact with the device side electrode and may be sensed at either vertical bus bar (terminal Sv 144 shown).

The 4-wire touch screen measurement may be improved by providing independent sensing traces (not shown) between each bus bar and the voltage measurement subsystem. This 8-wire configuration makes advantageous use of the high impedance of the voltage measurement subsystem, and thus low current in the additional sense traces, to reduce errors associated with voltage drops in the 4-lead leads of the earlier discussed configuration.

FIG. 3 shows an alternative 5-wire touch screen architecture wherein the rectangular device side conductor 120 is provided with combined driving and sensing terminations at each of the four corners. One corner 251 (upper left shown) is connected to the positive power supply while the diagonally opposite corner is grounded. The remaining corners are connected via switching devices to either V+ or ground according to logic levels generated by the touch screen controller.

The horizontal component of the two-dimension touch position is determined by applying logic levels to terminals "A", to place switching devices 301 in a conductive state, thus imposing a horizontal voltage gradient in the touch side electrode 120. The logic levels on terminals "B" place those switches 302 in an off state.

The touch side conductor plane 110 forms the fifth terminal of the 5-wire configuration and is used to sense the local voltage of the device side conductor at the point of contact when touched via terminal "S".

The vertical component of touch position is determined by applying logic levels to turn switches "A" to an off state and switches "B" to an on state, creating a vertical voltage gradient in the device side conductor. The voltage at the touch side electrode is then pulled to the local potential at the point of contact with the device side electrode and may be sensed at terminal "S".

The 5-wire configuration may be enhanced by the addition of separate sensing connections (not shown) to the device side conductor at the corners where the drive voltage is selectively switched. In this 7-wire configuration, the additional traces may be used to sense the actual device side voltage thus reducing the errors associated with voltage drops across the switching devices or current carrying connecting traces.

In any of the touch screen configurations described, the roles and terminations of the touch side and device side conductors may be interchanged as desired without effecting the function or operating principle of the touch screen. Further, the designations of horizontal, vertical, left, right are arbitrary and are used for illustrative purposes. The direction of the voltage gradient in each sensing mode is chosen by the designer to suit the preferred orientation of the installed device. However, in the prior art, it is only necessary and possible to impose the voltage gradient within the selected planar conductor in a single direction for each sense mode.

Welsh et al in U.S. Pat. No. 6,469,267 illustrate the application of reduced DC voltage potential across a series circuit comprised of a 1 kOhm sense resistor, 9 kOhm dropping resistor, touch side conductor comprised of intrinsically conductive polymer and, via an intermittent contact patch created by repeatedly deforming the touch side conductor, to a device side conductor of ITO. The use of limited DC voltage resulted in an increased number of make and break cycles before the contact resistance reached a failure level, as determined by a 50% reduction in the series current through the sense resistor. The disclosure is applicable to the touch detection event, where current across the conductor interface is appreciable and may be limited by either increased resistance or decreased voltage as predicted by Ohms law.

U.S. Pat. No. 6,469,267 further illustrates the application of 60 Hz sinusoidal alternating current (AC) drive as a means of increasing the number of actuations of the switch like device before failure.

Thus, there is a new need to provide improved controller architectures that mitigate the degradation that results from using prior art control methodologies with organic conductor layers. An improved controller should operate equally well over a range of drive voltage and not depend on continuously time varying sinusoidal voltage levels. For resistive touch screen applications, it is advantageous for the improved controller to be backward compatible with preexisting inorganic touch screens.

PROBLEM TO BE SOLVED BY THE INVENTION

There is a need to improve the operating life of conductors employed in electronic devices, especially those that are comprised of organic conductive layers, such as polythiophene and polyaniline, which are adversely effected by the unipolar drive voltage as used in the prior art. In conductive layers comprising conductive polymers, these unipolar drive voltages, as a result of chemical reactions accelerated by heat, moisture, or exposure to reactive agents, can result in electrochemical processes that accelerate reduction in conductivity.

SUMMARY OF THE INVENTION

The present invention provides a method of extending the life of conductive polymer in a device comprising providing conductive polymer, passing direct current through said polymer, and reversing the voltage gradient in the organic polymer conductor.

It is an object of the present invention to stabilize the electrical properties of the conductive coatings comprising conductive polymers, particularly the sheet resistance.

It is another object of the present invention to maintain the resolution and accuracy of a resistive touch screen comprising conductive polymers.

It is another object of the present invention to maintain the load resistance and power dissipation level and spatial uniformity of a resistive heater comprising conductive polymers.

It is another object of the present invention to maintain the design resistance value of bus bars and interconnects comprising conductive polymers.

It is another object of the of the present invention to stabilize the conductive properties of continuous or segmented elements of lighting systems comprising conductive polymers.

It is a further object of the present invention to prolong the life of elements, such as column and row electrodes and interconnects in electronic displays comprising conductive polymers.

These and other objects of the invention are accomplished by a device comprising providing conductive polymer, passing direct current through said polymer, and reversing the voltage gradient in the organic polymer conductor.

ADVANTAGEOUS EFFECT OF THE INVENTION

The invention provides improved operating life of conductors employed in electronic devices, especially those that are comprised of organic conductive layers, such as polythiophene. The application of the invention diminishes the reduction in conductivity that results from electro-chemical processes that otherwise occur under sustained direct current. Polymeric conductor longevity comparable to that of ITO conductors is attained.

DETAILED DESCRIPTION OF THE INVENTION

Figure 1:
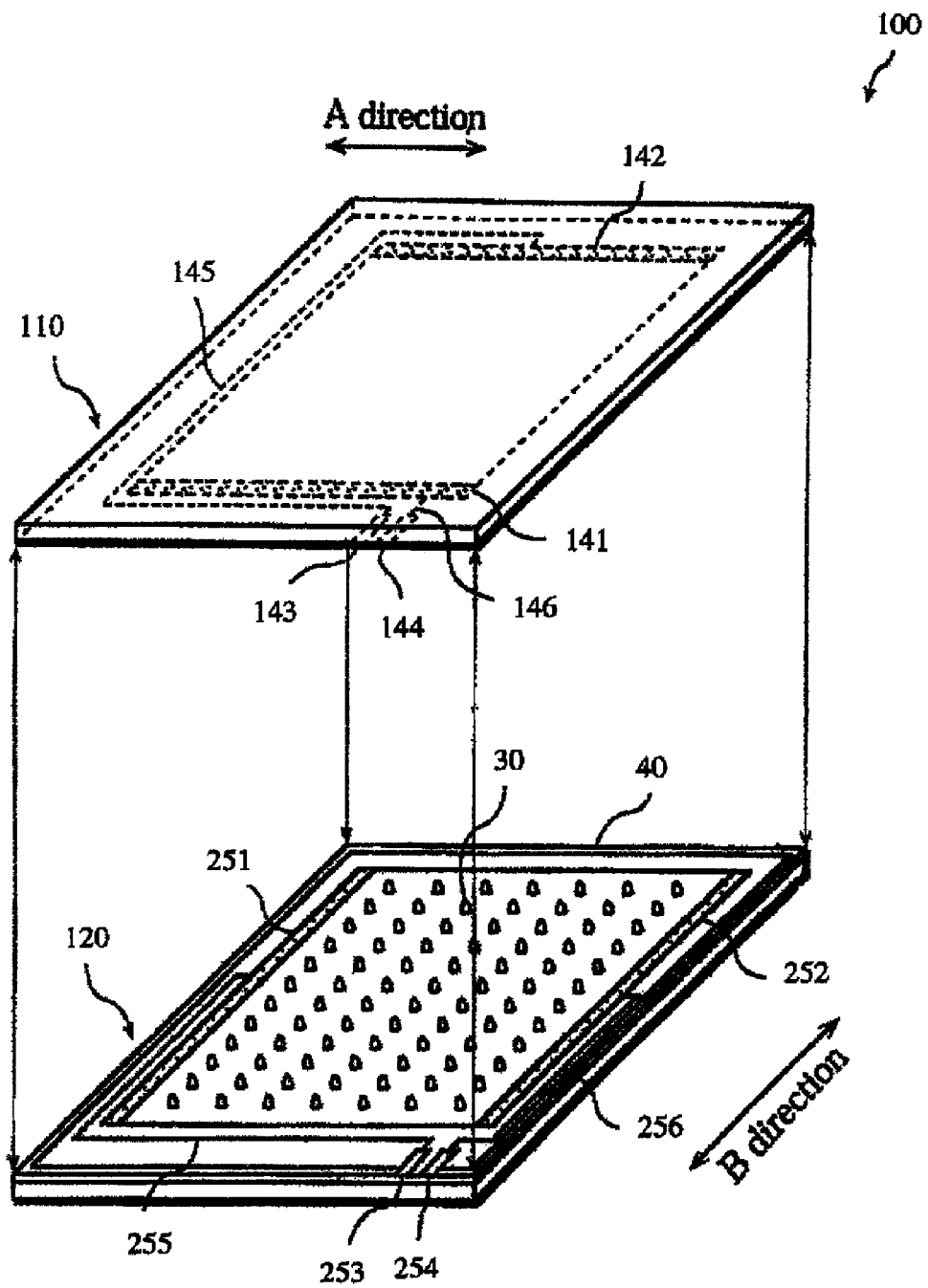
FIG. 1. An exploded view showing the construction of a 4-wire touch screen illustrating the use of planar conductor layers wherein voltage gradients are produced at selected times.

The invention has numerous advantages including increased life and stabilized resistance for organic conductors used in a range of applications. The invention does not depend on sinusoidal alternating current sources and is thus advantaged in battery powered or automotive applications where DC power is readily available. The invention also avoids issues created by electromagnetic interference (EMI) caused by alternating current sources. In touch screen applications, the invention allows greater voltage potential to be applied for greater touch resolution and increased signal to noise ratio. The invention does not require precisely timed sampling of continuously varying AC signal levels and provides improvements in the touch event detection and position measurement phases of touch screen control. It is another object of the present invention to maintain the load resistance and power dissipation level and spatial uniformity of a resistive heater comprising conductive polymers. It is another object of the present invention to maintain the design resistance value of bus bars and interconnects comprising conductive polymers. It is another object of the present invention to stabilize the conductive properties of continuous or segmented elements of lighting systems comprising conductive polymers. It is a further object of the present invention to prolong the life of elements, such as column and row electrodes and interconnects in electronic displays comprising conductive polymers. These and other objects of the invention are accomplished by a device comprising providing conductive polymer, passing direct current through said polymer, and reversing the voltage gradient in the organic polymer conductor. These and other advantages will be apparent from the description below.

The present invention provides a method of extending the life of conductive polymer in a device comprising providing conductive polymer, passing direct current through said polymer, and reversing the voltage gradient in the organic polymer conductor.

In an embodiment, the reversing of the voltage gradient is carried out prior to deterioration of conductive polymer properties. In an embodiment, the switching elements reverse the voltage gradient after each use of the conductive polymer. In an embodiment of the invention, the reversing of the gradient is carried out by split rail supply.

In any of the touch screen configurations described, the roles and terminations of the touch side and device side conductors may be interchanged as desired without effecting the function or operating principle of the touch screen. Further, the designations of horizontal, vertical, left, right are arbitrary and are used for illustrative purposes. The direction of the voltage gradient in each sensing mode is chosen by the designer to suit the preferred orientation the installed device.

The conductive layer can comprise any of the known electronically conductive polymers, such as substituted or unsubstituted pyrrole-containing polymers (as mentioned in U.S. Pat. Nos. 5,665,498 and 5,674,654), substituted or unsubstituted thiophene-containing polymers (as mentioned in U.S. Pat. Nos. 5,300,575, 5,312,681, 5,354,613, 5,370,981, 5,372,924, 5,391,472, 5,403,467, 5,443,944, 5,575,898, 4,987,042, and 4,731,408) and substituted or unsubstituted aniline-containing polymers (as mentioned in U.S. Pat. Nos. 5,716,550, 5,093,439, and 4,070,189). However, particularly suitable are those, which comprise an electronically conductive polymer in its cationic form and a polyanion, since such a combination can be formulated in aqueous medium and hence environmentally desirable. Examples of such polymers are disclosed in U.S. Pat. Nos. 5,665,498 and 5,674,654 for pyrrole-containing polymers and U.S. Pat. No. 5,300,575 for thiophene-containing polymers. Among these, the thiophene-containing polymers are most preferred because of their light and heat stability, dispersion stability and ease of storage and handling. Polyethylenedioxythiophene (PEDOT) is a particularly preferred material as it has good heat stability and good wear properties.

Preparation of the Aforementioned Thiophene Based Polymers has been discussed in detail in a publication titled "Poly (3,4-ethylenedioxythiophene) And its derivatives: past, present and future" by L. B. Groenendaal, F. Jonas, D. Freitag, H. Pielartzik and J. R. Reynolds in Advanced Materials, (2000), 12, No. 7, pp. 481-494, and references therein.

In one prior embodiment, the layer containing the electronically conductive polymer is prepared by applying a mixture comprising:

a) a polythiophene according to Formula I

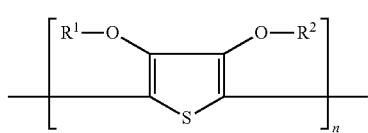

in a cationic form, wherein each of R1 and R2 independently represents hydrogen or a C1-4 alkyl group or together represent an optionally substituted C1-4 alkylene group or a cycloalkylene group, preferably an ethylene group, an optionally alkyl-substituted methylene group, an optionally C1-12 alkyl- or phenyl-substituted 1,2-ethylene group, a 1,3-propylene group or a 1,2-cyclohexylene group; and n is 3 to 1000;

and b) a polyanion compound;

It is preferred that the electronically conductive polymer and polyanion combination is soluble or dispersible in organic solvents or water or mixtures thereof. For environmental reasons, aqueous systems are preferred. Polyanions used with these electronically conductive polymers include the anions of polymeric carboxylic acids such as polyacrylic acids, poly(methacrylic acid), and poly(maleic acid), and polymeric sulfonic acids such as polystyrenesulfonic acids and polyvinylsulfonic acids, the polymeric sulfonic acids being preferred for use in this invention because of its stability and availability in large scale. These polycarboxylic and polysulfonic acids may also be copolymers formed from vinylcarboxylic and vinylsulfonic acid monomers copolymerized with other polymerizable monomers such as the esters of acrylic acid and styrene. The molecular weight of the polyacids providing the polyanions preferably is 1,000 to 2,000,000 and more preferably 2,000 to 500,000. The polyacids or their alkali salts are commonly available, for example as polystyrenesulfonic acids and polyacrylic acids, or they may be produced using known methods. Instead of the free acids required for the formation of the electrically conducting polymers and polyanions, mixtures of alkali salts of polyacids and appropriate amounts of monoacids may also be used. The polythiophene to polyanion weight ratio can widely vary between 1:99 to 99:1, however, optimum properties such as high electrical conductivity and dispersion stability and coatability are obtained between 85:15 and 15:85, and more preferably between 50:50 and 15:85. The most preferred electronically conductive polymers include poly(3,4-ethylene dioxythiophene styrene sulfonate) which comprises poly(3, 4-ethylene dioxythiophene) in a cationic form and polystyrenesulfonic acid.

Desirable results such as enhanced conductivity of the conductive layer can be accomplished by incorporating a conductivity enhancing agent (CEA). Preferred CEAs are organic compounds containing dihydroxy, poly-hydroxy, carboxyl, amide, or lactam groups, such as (1) those represented by the following Formula II:

$(OH)_n—R—(COX)_m$  II wherein m and n are independently an integer of from 1 to 20, R is an alkylene group having 2 to 20 carbon atoms, an arylene group having 6 to 14 carbon atoms in the arylene chain, a pyran group, or a furan group, and X is —OH or —NYZ, wherein Y and Z are independently hydrogen or an alkyl group; or (2) a sugar, sugar derivative, polyalkylene glycol, or glycerol compound; or (3) those selected from the group consisting of N-methylpyrrolidone, pyrrolidone, caprolactam, N-methyl caprolactam, dimethyl sulfoxide or N-octylpyrrolidone; or (4) a combination of the above.

Particularly preferred CEAs are: sugar and sugar derivatives such as sucrose, glucose, fructose, lactose; sugar alcohols such as sorbitol, mannitol; furan derivatives such as 2-furancarboxylic acid, 3-furancarboxylic acid; alcohols such as ethylene glycol, glycerol, di- or triethylene glycol. Most preferred CEAs are ethylene glycol, glycerol, di- or triethylene glycol, as they provide maximum conductivity enhancement.

The CEA can be incorporated by any suitable method. Preferably the CEA is added to the coating composition comprising the electronically conductive polymer and the polyanion. Alternatively, the coated and dried conductive layer can be exposed to the CEA by any suitable method, such as a post-coating wash.

The concentration of the CEA in the coating composition may vary widely depending on the particular organic compound used and the conductivity requirements. However, convenient concentrations that may be effectively employed in the practice of the present invention are about 0.5 to about 25 weight %; more conveniently 0.5 to 10 and more desirably 0.5 to 5 for effective charge enhancement.

The conductive layer can be formed by any method known in the art. Particularly preferred methods include coating from a suitable coating composition by any well known coating method such as air knife coating, gravure coating, hopper coating, curtain coating, roller coating, spray coating, electrochemical coating, inkjet printing, flexographic printing, stamping, and the like.

While the conductive layer can be formed without the addition of a film-forming polymeric binder, a film-forming binder can be employed to improve the physical properties of the layer. In such an embodiment, the layer may comprise from about 1 to 95% of the film-forming polymeric binder. However, the presence of the film forming binder may increase the overall surface electrical resistivity of the layer. The optimum weight percent of the film-forming polymer binder varies depending on the electrical properties of the electronically conductive polymer, the chemical composition of the polymeric binder, and the requirements for the particular circuit application.

Polymeric film-forming binders useful in the conductive layer of this invention can include, but are not limited to, water-soluble or water-dispersible hydrophilic polymers such as gelatin, gelatin derivatives, maleic acid or maleic anhydride copolymers, polystyrene sulfonates, cellulose derivatives (such as carboxymethyl cellulose, hydroxyethyl cellulose, cellulose acetate butyrate, diacetyl cellulose, and triacetyl cellulose), polyethylene oxide, polyvinyl alcohol, and poly-N-vinylpyrrolidone. Other suitable binders include aqueous emulsions of addition-type homopolymers and copolymers prepared from ethylenically unsaturated monomers such as acrylates including acrylic acid, methacrylates including methacrylic acid, acrylamides and methacrylamides, itaconic acid and its half-esters and diesters, styrenes including substituted styrenes, acrylonitrile and methacrylonitrile, vinyl acetates, vinyl ethers, vinyl and vinylidene halides, and olefins and aqueous dispersions of polyurethanes and polyesterionomers.

Other ingredients that may be included in the conductive layer include but are not limited to surfactants, defoamers or coating aids, charge control agents, thickeners or viscosity modifiers, antiblocking agents, coalescing aids, crosslinking agents or hardeners, soluble and/or solid particle dyes, matte beads, inorganic or polymeric particles, adhesion promoting agents, bite solvents or chemical etchants, lubricants, plasticizers, antioxidants, colorants or tints, and other addenda that are well-known in the art. Preferred bite solvents can include any of the volatile aromatic compounds disclosed in U.S. Pat. No. 5,709,984, as "conductivity-increasing" aromatic compounds, comprising an aromatic ring substituted with at least one hydroxy group or a hydroxy substituted substituents group. These compounds include phenol, 4-chloro-3-methyl phenol, 4-chlorophenol, 2-cyanophenol, 2,6-dichlorophenol, 2-ethylphenol, resorcinol, benzyl alcohol, 3-phenyl-1-propanol, 4-methoxyphenol, 1,2-catechol, 2,4-dihydroxytoluene, 4-chloro-2-methyl phenol, 2,4-dinitrophenol, 4-chlororesorcinol, 1-naphthol, 1,3-naphthalenediol and the like. These bite solvents are particularly suitable for polyester based polymer sheets of the invention. Of this group, the most preferred compounds are resorcinol and 4-chloro-3-methyl phenol. Preferred surfactants suitable for these coatings include nonionic and anionic surfactants. Preferred crosslinking agents suitable for these coatings include silane compounds, more preferably epoxy silane. Suitable silane compounds are disclosed in U.S. Pat. No. 5,370,981.

The conductive layer should contain about 1 to about 1000 mg/m2 dry coating weight of the electronically conductive polymer. Preferably, the conductive layer should contain about 5 to about 500 mg/m2 dry coating weight of the electronically conductive polymer. The actual dry coating weight of the conductive polymer applied is determined by the properties of the particular conductive polymer employed and by the requirements of the particular application. These requirements include conductivity, transparency, optical density and cost for the layer.

Reduced voltage is not advantageous to the touch screen position measurement process, where current between conductor planes is already negligible due to the high input impedance of the voltage sensing circuitry. Reduced drive voltage is detrimental to the resolution of the position measurement because of the smaller gradient that can be created within the non-sensing conductor plane and the associated decrease in signal to ambient noise.

The use of AC drive is problematic for portable battery powered devices due to the necessity of generating sinusoidal AC onboard. The use of AC creates additional problems with emission of and susceptibility to radiated noise. Also, the touch position signal would be continuously varying and require precise sampling, demodulating, rectifying, or other processing to recover the actual touch position. Control of sampling time is impractical with respect to brief randomly timed touch events.

By using a driving architecture, comprised of a DC voltage source, planar conductors, multiplexing elements and timed switching patterns, which selectively reverses the direction of voltage gradients produced in the planar conductors of the device, the net charge transfer in the conductor is near zero.

Figure 4:
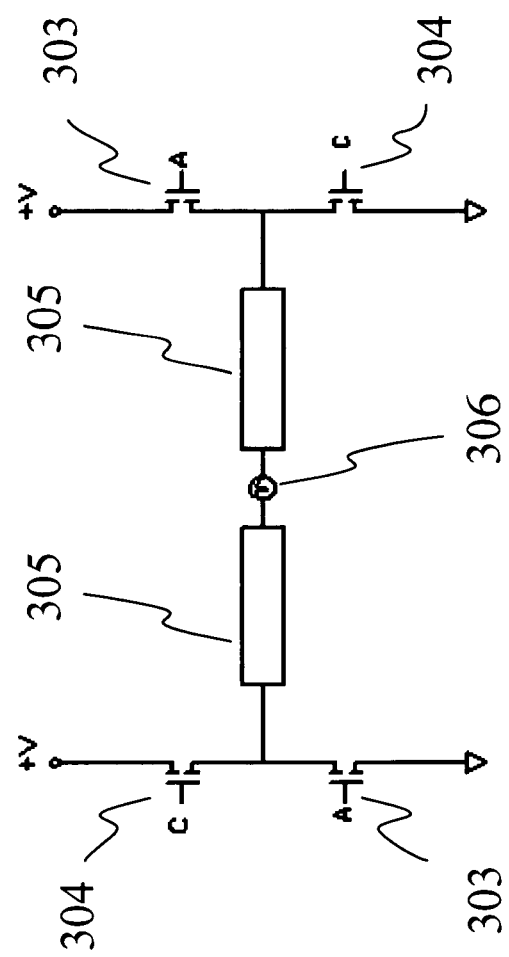
FIG. 4. H-Bridge implementation of the instant invention with load device driven via conductive polymer conductors FIG. 5. Implementation of the instant invention using a pair of double pole-double throw switch elements to provide reversal of current direction in organic conductors while preserving polarity at load device.

FIG. 4. shows an implementation of the present invention wherein an electrical load 306, schematically shown as a lamp, but which could be any other polarity insensitive load, including but not limited to a resistive heater element, or a series or shunt wound universal motor, is located at the ends of conductive polymer bus bars 305. An H-bridge switching configuration is provided to allow the direction of current through the bus bars to be reversed by enabling switch elements A 303 or C 304, but not both simultaneously. This implementation is also suitable for applications wherein the polymer conductor 305 is the principle load device, as in a clear conductive heater.

Figure 5:
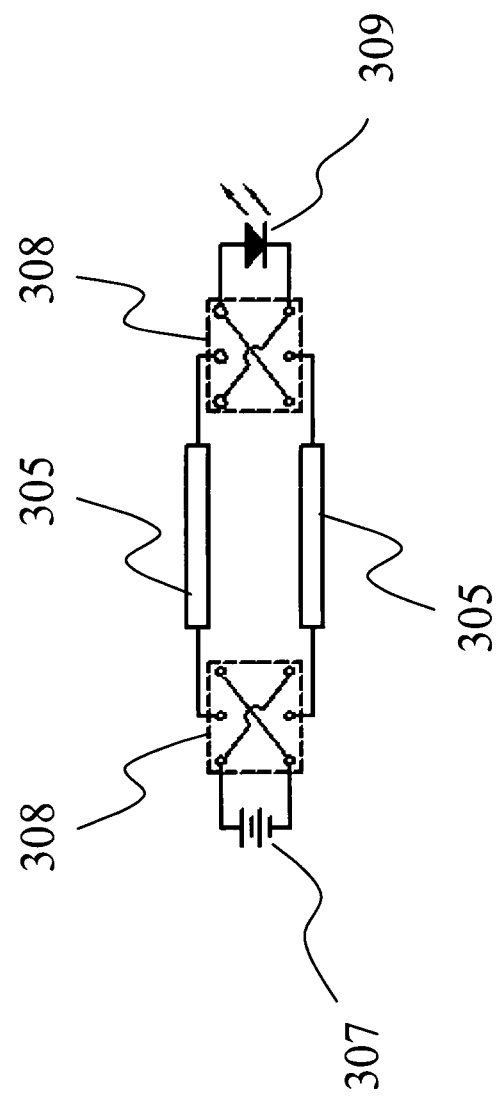

FIG. 5. shows the application of the instant invention using a pair of double pole-double throw (DPDT) switching elements 308, which may be implemented using mechanical switches, semi conductors, or other switch elements known to a practitioner, to provide selective reversal of current direction from a DC voltage source 307, in the organic conductors 305, while preserving direction at the polarity sensitive load device 309, illustrated as but not limited to, a light emitting diode (LED).

As applied to resistive touch screen applications, the instant invention provides a touch screen driving mechanism in which the direction of the voltage gradient in the planar conductors of the touch screen may be imposed in either principle direction for each (horizontal or vertical) sense mode. This enhanced controller capability is accomplished by the incorporation of additional switching devices to implement an H-bridge, or switch configuration with equivalent functionality with respect to bus bar voltage potential, wherein the bus bars at each end of a 4-wire or derived configuration, or corner in the case of 5-wire and derived configurations, of the touch screen may be selectively coupled to either the source or ground connections of a unipolar direct current power supply.

Thus, in any selected sense mode, horizontal or vertical, the imposed voltage gradient can be bidirectional as determined via the controller logic.

Figure 2:
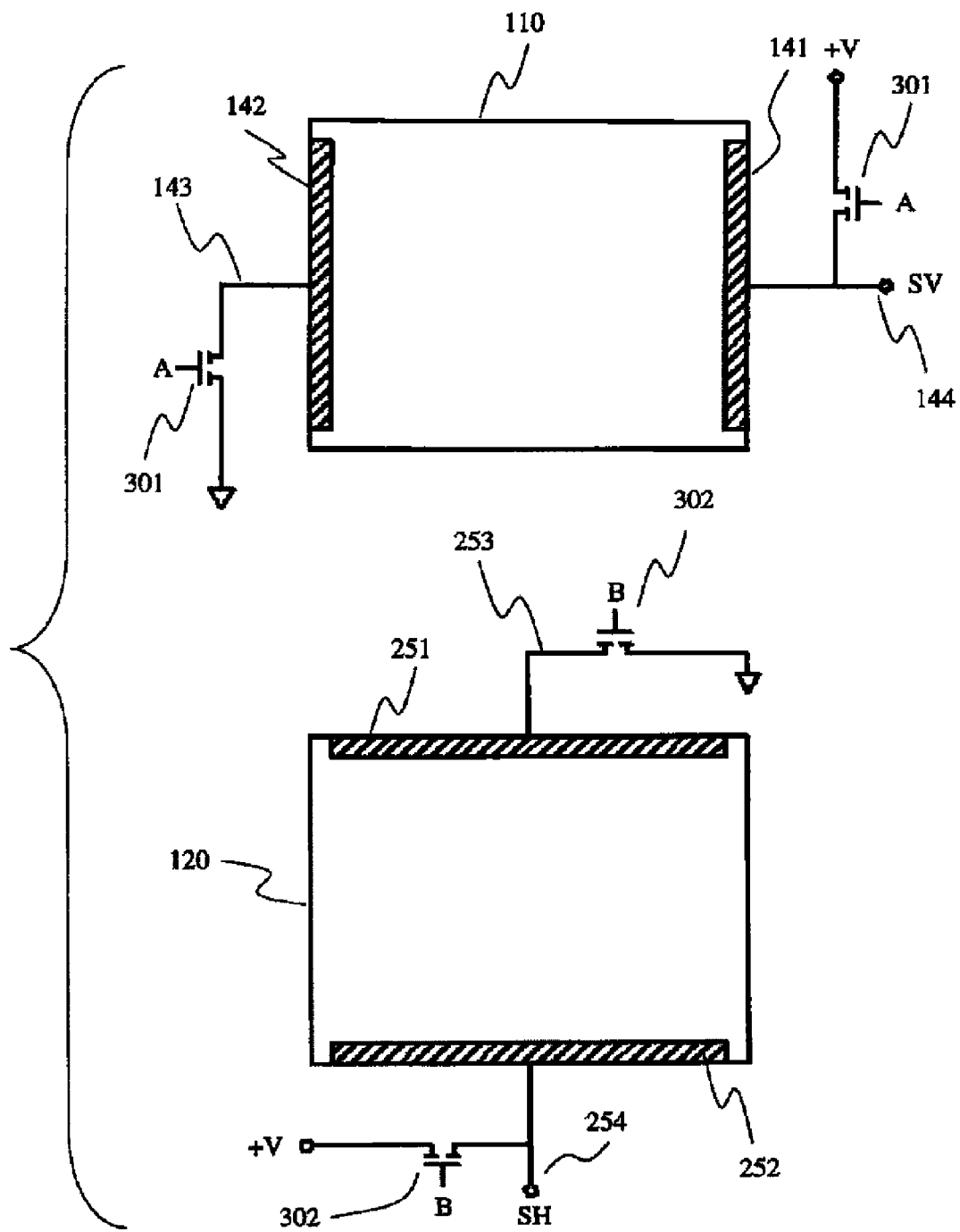
FIG. 2. A schematic diagram of a 4-wire resistive touch screen with drive switching elements of the prior art.
Figure 6:
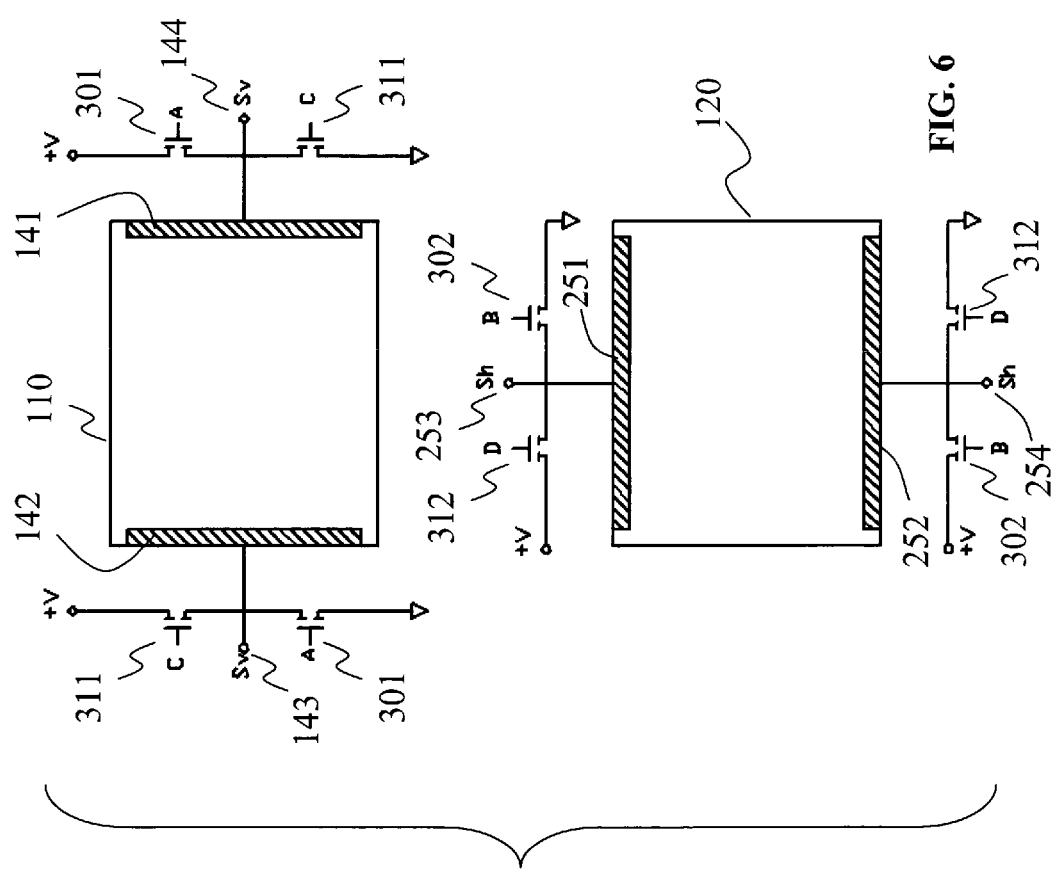
FIG. 6. A schematic diagram of a 4-wire resistive touch screen with drive switching elements to implement the instant invention.

FIG. 6 shows an implementation of the switching configuration of the instant invention as applied to 4-wire touch screens and also applicable to an 8-wire variation derived thereof (not shown). In comparison to FIG. 2, the H-bridge has been completed by the addition of switching devices 311 and 312 and logic signals C and D.

The horizontal component of the two-dimension touch position in a first event is determined by applying logic levels to terminals "A", to place those switching devices in a conductive state, while deactivating devices at terminals B, C, and D, thus imposing an increasing horizontal voltage gradient, from left to right, in the touch side electrode. The voltage of the device side electrode is pulled to the local voltage at the point where it makes contact with the touch side electrode. The potential of the device side layer may be measured at either horizontal bus bar (terminal Sh 254 shown).

The vertical component of touch position is first determined by applying logic levels to turn switches "B" to an on state and switches "A,C, and D" in an off state, creating a vertical voltage gradient increasing from bottom to top in the device side conductor. The voltage at the touch side electrode is then pulled to the local potential at the point of contact with the device side electrode and may be sensed at either vertical bus bar (terminal Sv 144 shown).

The horizontal component of the two-dimension touch position is determined in a subsequent event by applying logic levels to terminals "C", to place those switching devices in a conductive state while deactivating devices at terminals A,B, and D, thus imposing an decreasing horizontal voltage gradient, from left to right, in the touch side electrode. The voltage of the device side electrode is pulled to the local voltage at the point where it makes contact with the touch side electrode. The potential of the device side layer may be measured at either horizontal bus bar (terminal Sh shown).

The vertical component of touch position is determined in a subsequent event by applying logic levels to turn switches "D" to an on state and switches "A,C, and C" in an off state, creating a vertical voltage gradient decreasing from bottom to top in the device side conductor. The voltage at the touch side electrode is then pulled to the local potential at the point of contact with the device side electrode and may be sensed at either vertical bus bar (terminal Sv shown).

The 4-wire touch screen measurement may be improved by providing independent sensing traces (not shown) between each bus bar and the voltage measurement subsystem. This 8-wire configuration makes advantageous use of the high impedance of the voltage measurement subsystem, and thus low current in the additional sense traces, to reduce errors associated with voltage drops in the 4-wire leads of the earlier discussed configuration.

Instant Invention Example 2

Switch Implementation for 5-Wire TouchScreen Controller

Figure 3:
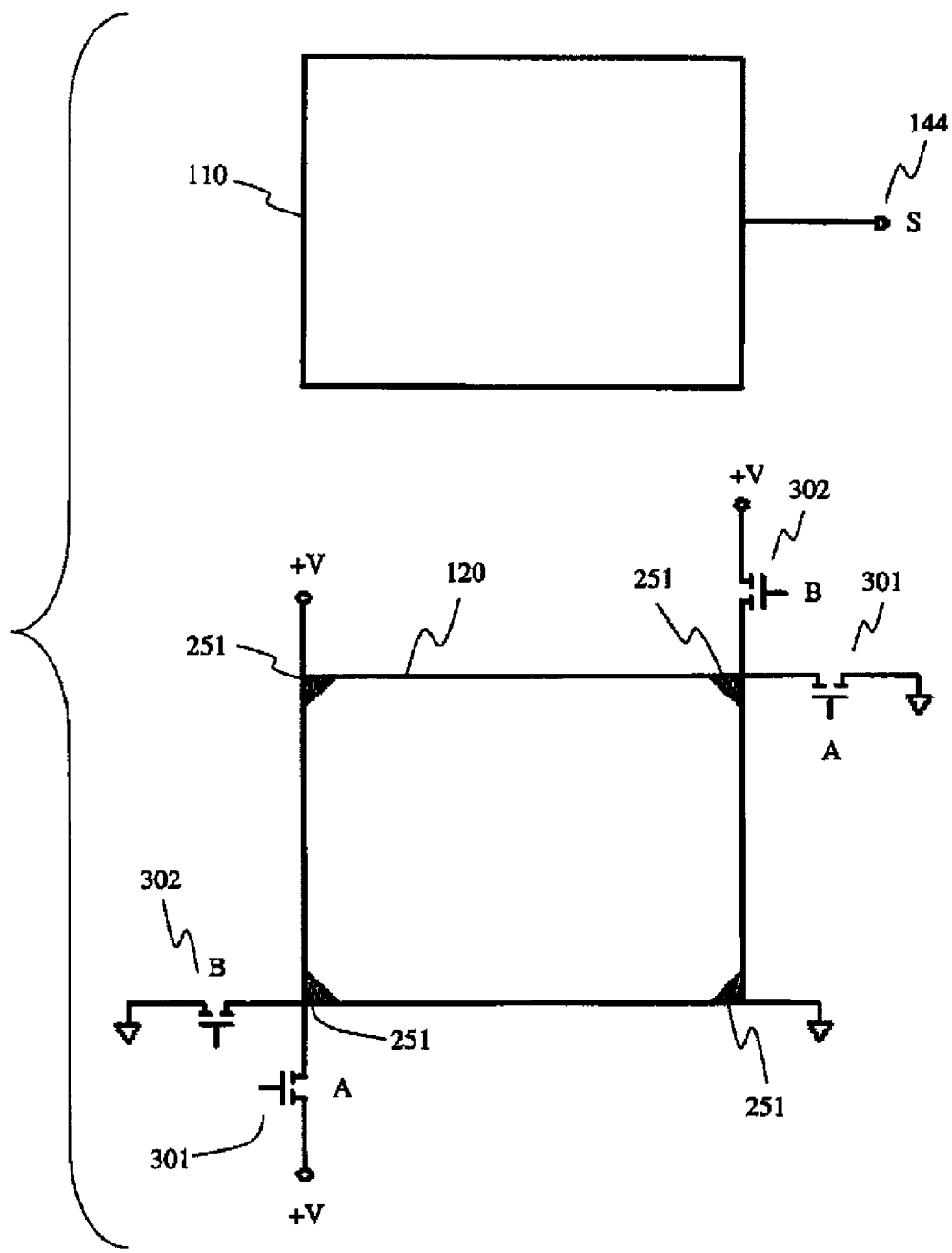
FIG. 3. A schematic diagram of a 5-wire resistive touch screen with drive switching elements of the prior art.
Figure 7:
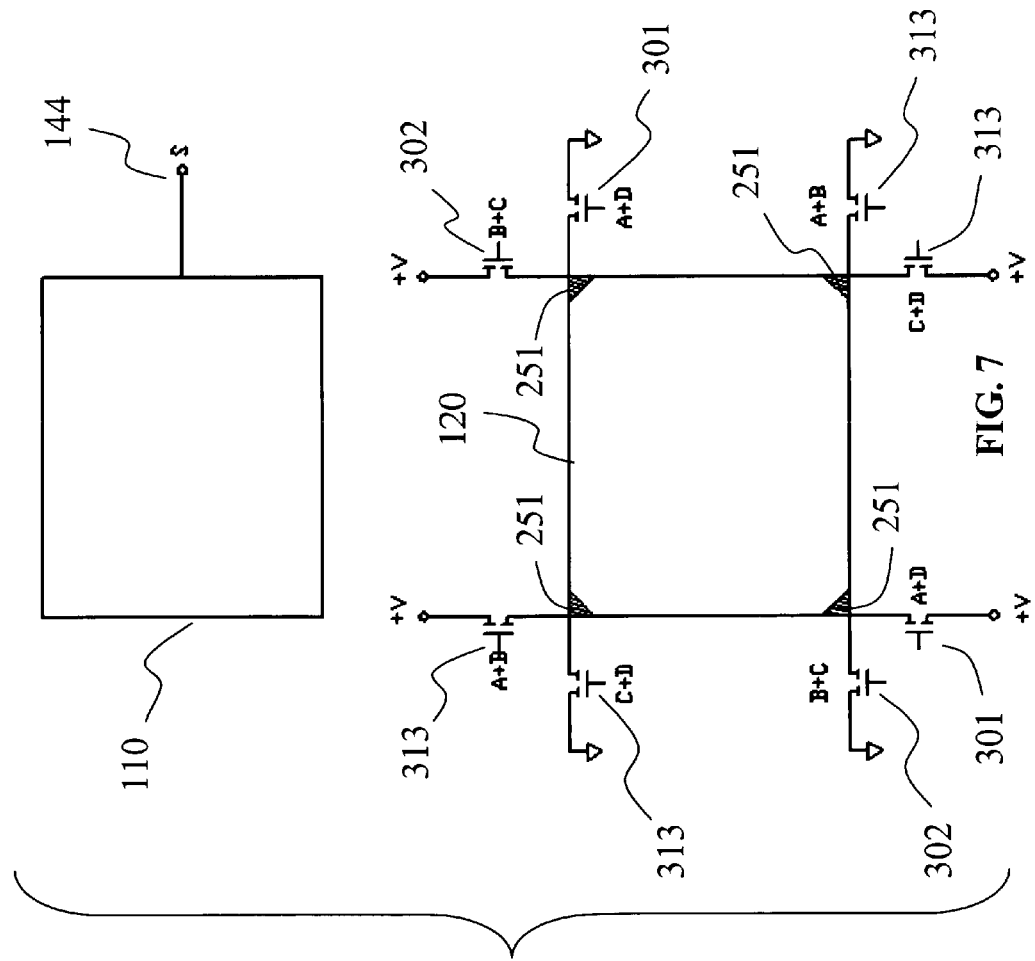
FIG. 7. A schematic diagram of a 5-wire resistive touch screen with drive switching elements to implement the instant invention.

FIG. 7 shows an implementation of the switching configuration of the instant invention as applied to 5-wire touch screens and also applicable to a 7 or 9-wire variations derived thereof (not shown). In comparison to FIG. 3, each corner of the device side electrode has been provided with an independently selectable path to the positive source or ground via the addition of switching devices 313 and logic signals C and D wherein the letter designation indicates the 4 position detecting modes and associated voltage gradient directions analogous to the description of the previous example. Each switching device is conductive, or ON, in two of the detection modes, thus the control signals are shown with OR logic applied to the controlling gate.

When logic signal A is exclusively active, a horizontal voltage gradient, decreasing from left to right is imposed. When signal B is exclusively active, the vertical gradient is decreasing from top to bottom. When logic signal C is exclusively active, a horizontal voltage gradient, increasing from left to right is imposed. When signal D is exclusively active, the vertical gradient is increasing from top to bottom.

The touch position voltage is sensed in all modes at the touch side conductor terminal S 144.

The 5-wire configuration may be enhanced by the addition of separate sensing connections (not shown) to the device side conductor at two diagonally opposite corners or more preferably at all four corners where the drive voltage is selectively switched. In this 7 or 9-wire configuration, the additional traces may be used to sense the actual device side voltage thus reducing the errors associated with voltage drops across the switching devices or current carrying connecting traces.

Through the application of logical control signals interfaced to the switching devices, the total time of current flow in either direction, within the conductor plane, may be made nearly equal over the life of the touch screen. The net current flow (integral of the signed current flow over time) in the conductor layer is controlled by selection of the current direction such that net flow is preferably near zero.

The gradient direction change period is preferably on the order of seconds to hours, provided that it is short enough to avoid significant change in resistance of the conductor layers.

The period of gradient reversal is more preferably made coincident with the time needed to make a single position determination, such that every other measurement event is made with a gradient imposed in the opposite direction to the previous determination along that axis. Most preferably, a voltage gradient is only imposed when necessary to make a position determination subsequent to touch event detection.

Touch position calibration and linearization techniques known to a practitioner are used to provide correlated position coordinates irrespective of the direction of voltage gradient at the time of determination. Such techniques are extended in the present invention by comparison of the position determined in rapid sequential measurements, wherein the voltage gradient is in opposite directions but the touching object is essentially stationary. Analysis of the relative difference in position is used to find a corrected touch position. Further, the relative drift is indicative of the relative charge injection barrier development at each bus bar. The duty cycle of voltage gradient application may be altered from the 50% nominal value to modify and/or reverse barrier development and optimize touch screen life.

The controller may impose a voltage gradient in a selected direction for timed intervals without making position determinations and without the touch screen being in a deflected or actuated state. Such periods may be used for charge injection barrier compensation, self heating to provide a thermal energy source, touch screen or LCD preheating or temperature control.

EXAMPLES

The following non-limiting examples further describe the practice of the instant invention.

Comparative Example 1

ITO Conductor Driven by Direct Current Source of 5 VDC

Figure 8:
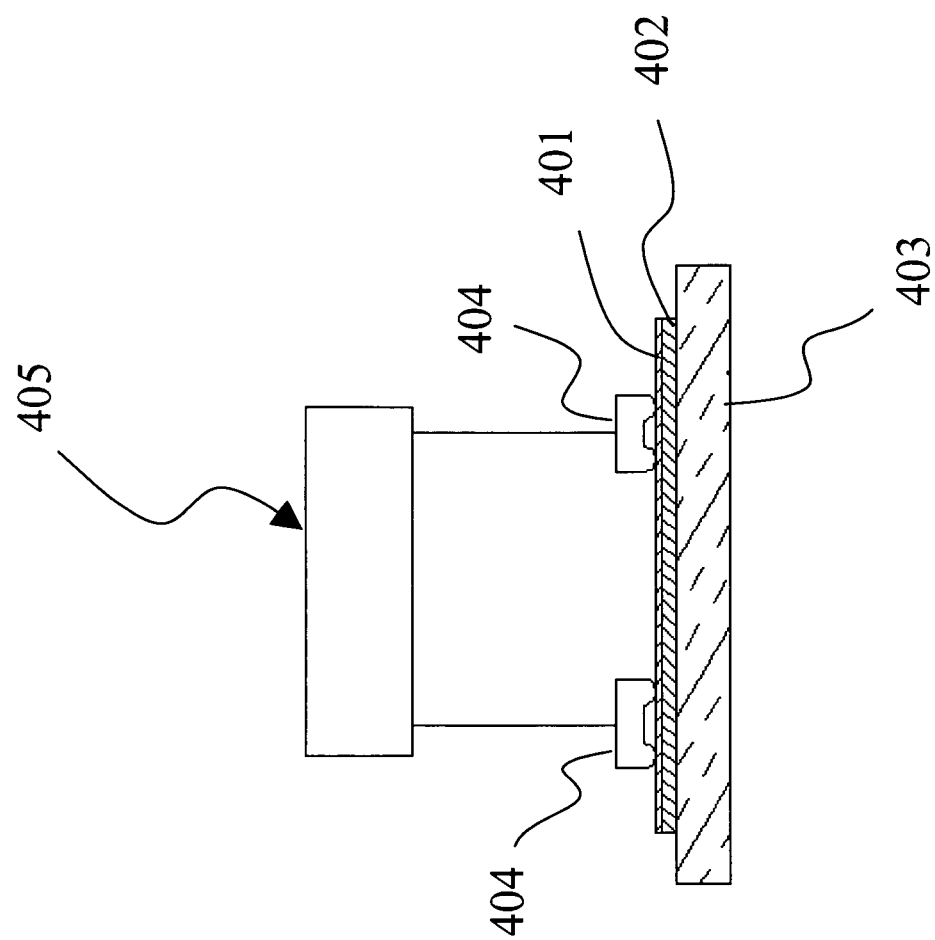
FIG. 8. A schematic diagram of the test system used to evaluate the conductance of transparent conductors under voltage drive levels of the prior art and the instant invention.

The series resistance of conductive coatings was evaluated over time by placing 8 mm wide×38 mm long samples, cut from a large conductive web, into an electrode fixture as shown in FIG. 8. The Sample was placed conductive side 401 up on the phenolic fixture base 403 and clamped by two ridged electrodes 404 comprised of selected materials, each having two half cylindrical lower surfaces providing parallel line contact across the sample. The electrodes were pulled toward the fixture base by machine screws on either side of the conductor sample (not shown). A Keithley Model 2400 Source-Meter 405 was connected by flexible copper lead wires to the electrodes in a 2-wire resistance configuration. A computer interface (not shown) allowed the source voltage and/or current to be modified according to a predefined test protocol while also monitoring and logging the sample resistance. Total charge transfer through the conductor was found by numerical integration of the absolute value of the instantaneous current.

Figure 9:
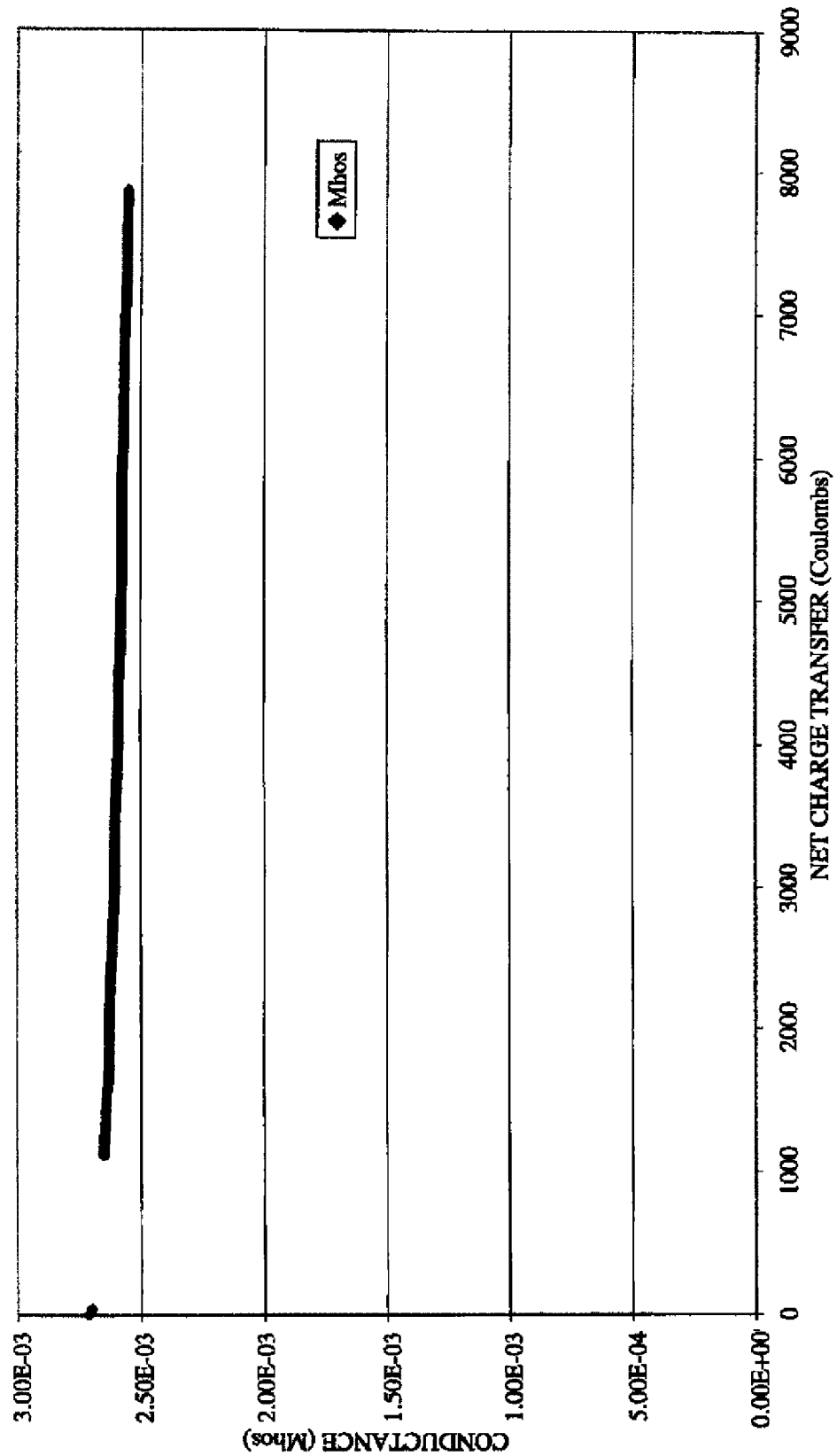
FIG. 9. Shows, based on the results of Comparative Example 1, the conductance profile as a function of total charge transfer for a single layer Bekaert ITO conductor driven by 5 VDC of the prior art.

FIG. 9 shows the conductance as a function of charge transfer for a Bekeart ITO of 300 Ohms/Square, as commonly used in touch screen applications. The conductor is subjected to a constant 5 volt differential, creating a unidirectional voltage gradient, as would be imposed by a touch screen controller of the prior art, for a period of 16,800 minutes. The observed conductance is substantially stable over the test duration.

Comparative Example 2

PEDOT Conductor Driven by Direct Current Source of 5 VDC

Figure 10:
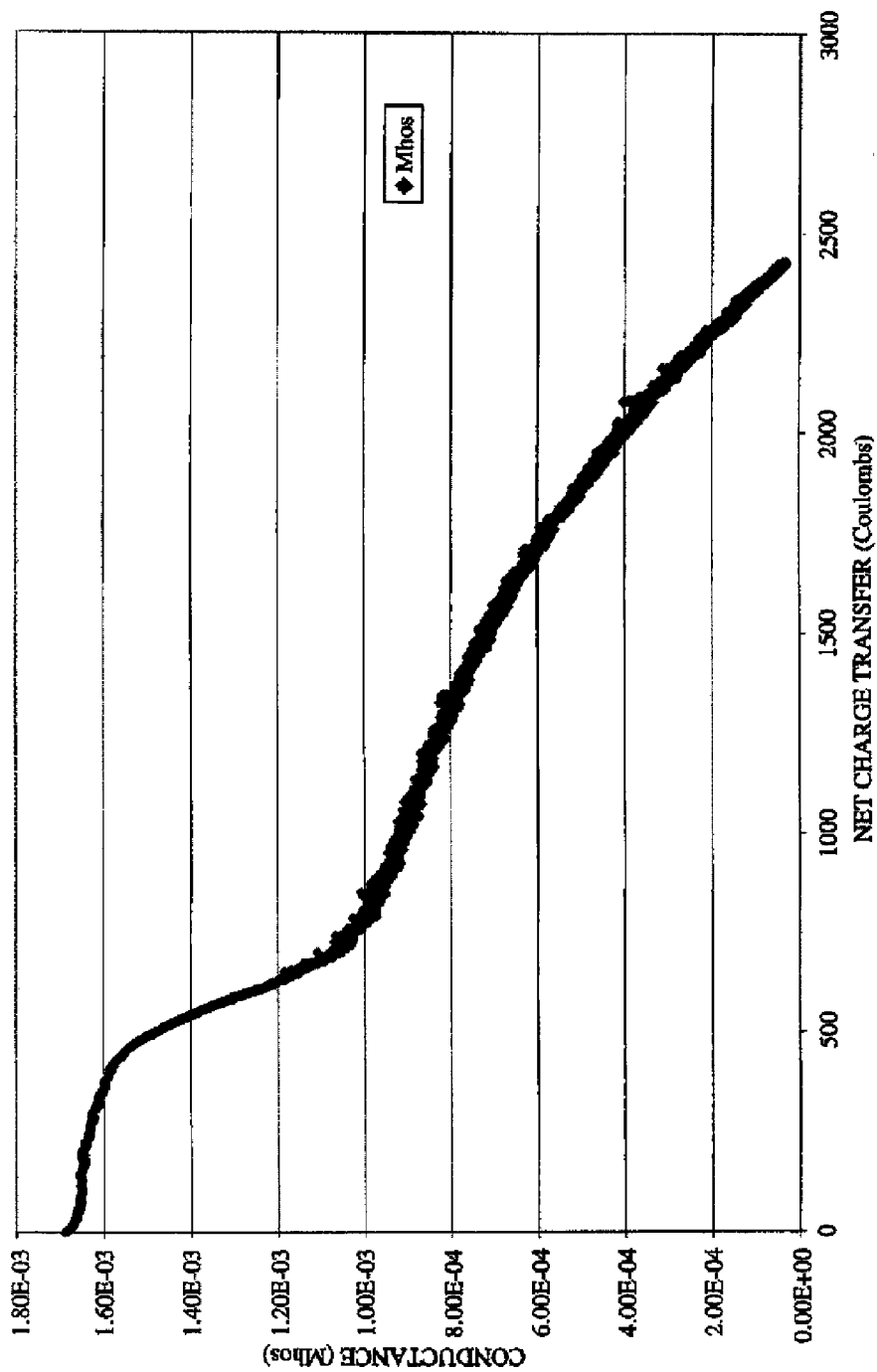
FIG. 10. Shows, based on the results of Comparative Example 2, the conductance profile as a function of total charge transfer for a single layer polythiophene conductor driven by 5 VDC of the prior art.

FIG. 10 shows the conductance for a PEDOT coated substrate having similar initial sheet resistance and tested under the same unidirectional voltage gradient. It is apparent that the conductance decreases undesirably under these driving conditions.

Comparative Example 3

PEDOT Conductor Driven by Direct Current Source of 1 VDC

Figure 11:
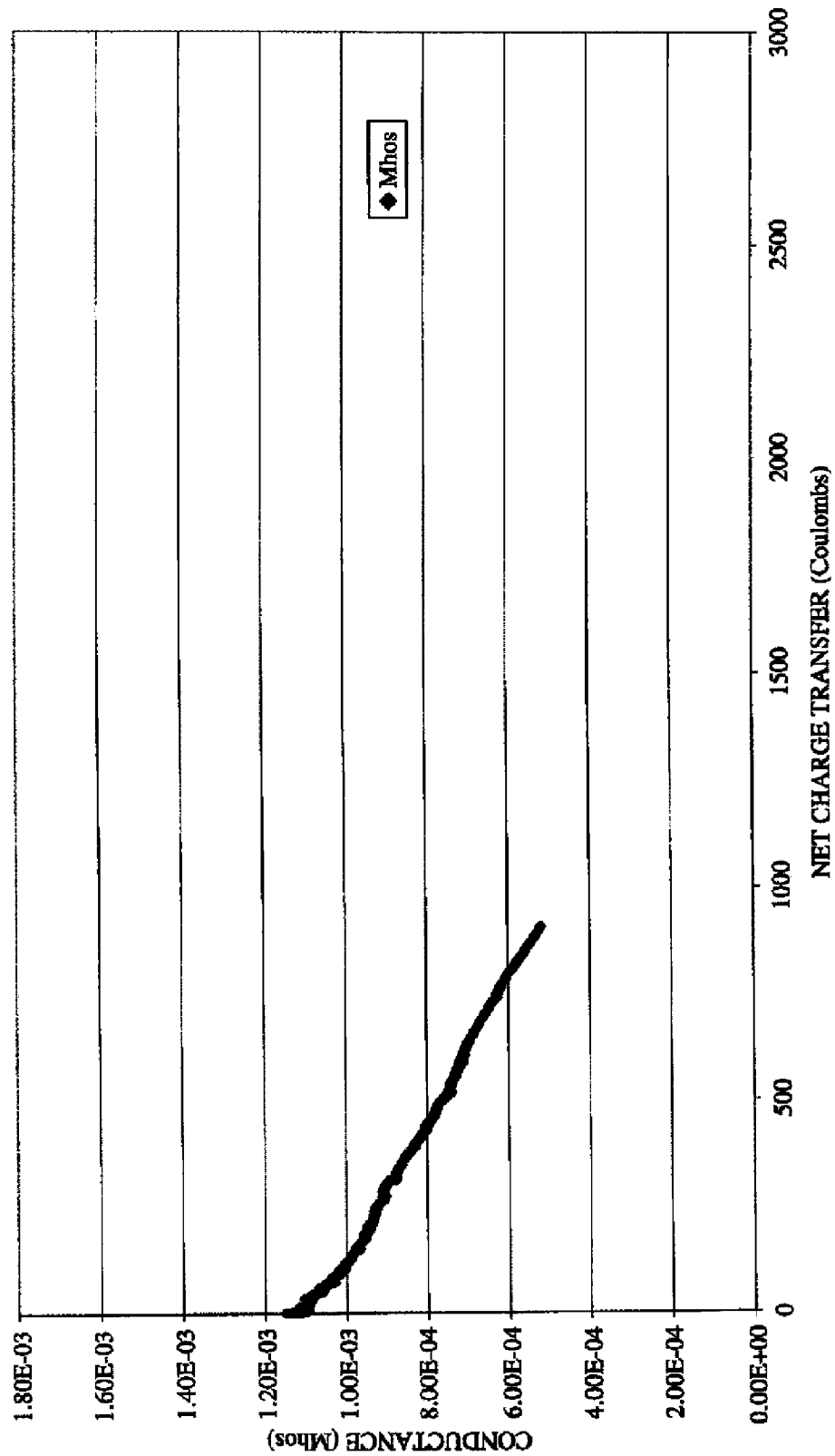
FIG. 11. Shows, based on the results of Comparative Example 3, the conductance profile as a function of total charge transfer for a single layer polythiophene conductor driven by 1 VDC of the prior art.

FIG. 11 shows the conductance as a function of charge transfer for a PEDOT coated substrate of the same composition as in FIG. 10, having a constant differential of 1 volt applied. Although the current (ie: time rate of charge transfer) is decreased in accordance with Ohms law, the rate of degradation, as indicated by the slope of the plotted data, is nearly the same as in the higher voltage case. Thus, any improvement in conductor lifetime is only a result of the lower current flow. There is no evidence that the primary electrochemical failure mechanism associated with the decay has been circumvented.

Comparative Example 4

PEDOT/CNT Multi-Layer Conductor Driven by Direct Current Source of 5 VDC

Figure 12:
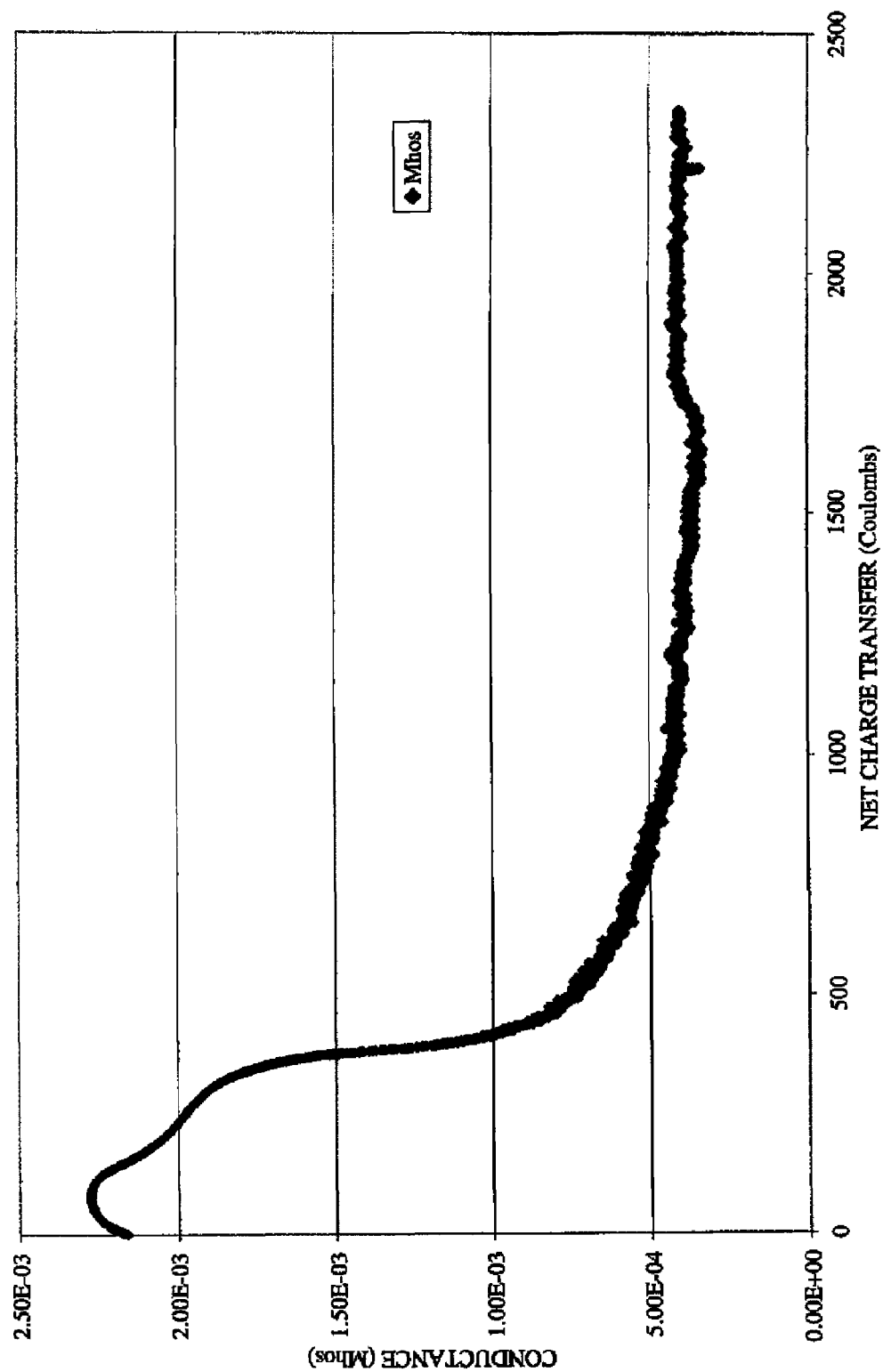
FIG. 12. Shows, based on the results of Comparative Example 4 below, the conductance profile as a function of total charge transfer for a multi-layer organic conductor, comprised of polythiophene and carbon nano-tubes, driven by 5 VDC of the prior art.

FIG. 12 shows the conductance as a function of total charge transfer for a multilayer conductive structure comprised of thiophene-containing polymer with a carbon nano-tube overcoat, as taught in U.S. application Ser. No. 11/143,562, filed Jun. 2, 2005. The conductive structure was subjected to a unidirectional voltage gradient created by a differential of 5 volts. It is apparent that the conductance decreases undesirably under these driving conditions. Comparative Examples 1-4 illustrate that repeated or prolonged application of direct current results in degradation of the conductivity of organic conductors. Undesirable resistance is added to circuits wherein the polymer conductor is used as means of transferring electrical power. This degradation produces a loss of touch screen accuracy and eventual loss of touch event detection capability if allowed to reach catastrophic levels.

Instant Invention Example 1

PEDOT Conductor Driven by Reversible Direct Current Source of 5 VDC

Figure 13:
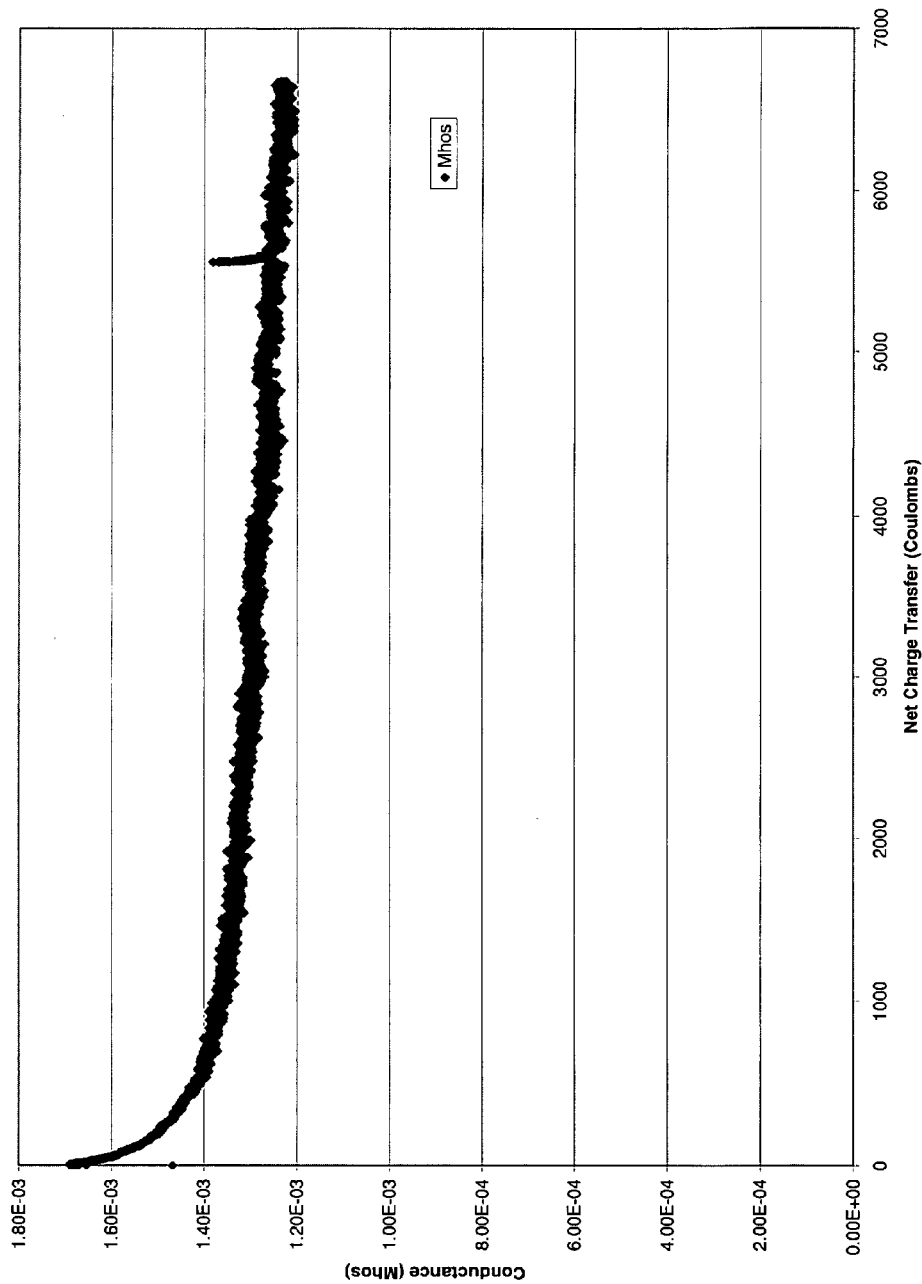
FIG. 13. Shows, based on the results of Instant Invention Example 1 below, the conductance profile as a function of total charge transfer for a single layer polythiophene conductor driven by 5 VDC with periodic reversal per the instant invention.

FIG. 13 shows the conductance as a function of total charge transfer for a PEDOT coated substrate of the same composition as Comparative Example 2 which was subjected to a bidirectional voltage gradient created by a differential of 5 volts which was reversed at a rate of once per second. The observed conductance is substantially more stable when compared to the Comparative Example of similar material and is comparable to the performance of ITO over the test duration.

Instant Invention Example 2

PEDOT Conductor Driven by Reversible Direct Current Source of 10 VDC

Figure 14:
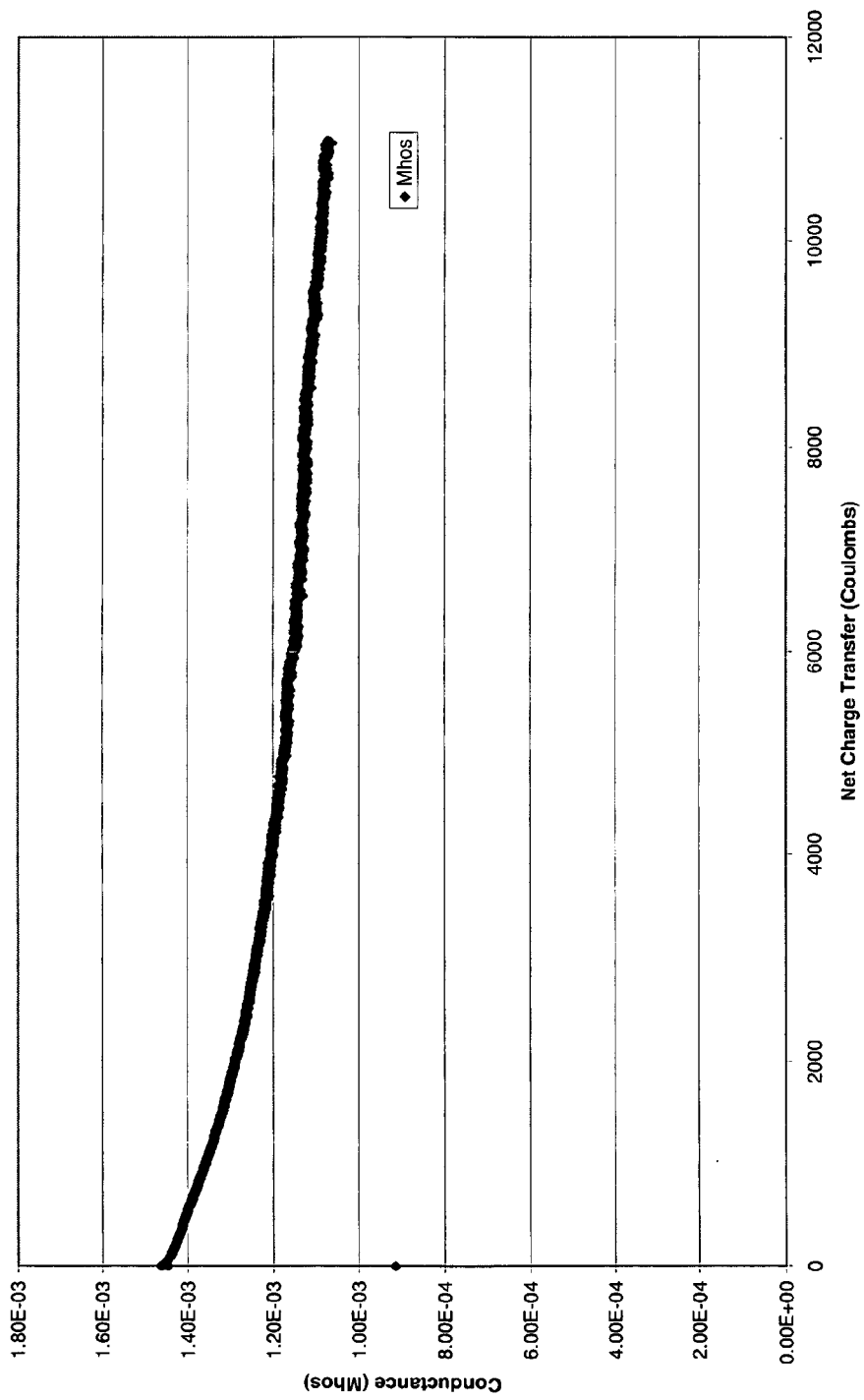
FIG. 14. Shows, based on the results of Instant Invention Example 2 below, the conductance profile as a function of total charge transfer for a single layer polythiophene conductor driven by 10 VDC with periodic reversal per the instant invention.

FIG. 14 shows the conductance as a function of total charge transfer for a PEDOT coated substrate of the same composition as Comparative Example 2 which was subjected to a bidirectional voltage gradient created by a differential of 10 volts which was reversed at a rate of once per second. The observed conductance vs charge performance is comparable to the of the same material in the previous example which was under a lesser voltage differential, thus illustrating the effectiveness of the instant invention at eliminating the need to use reduced RMS drive voltage to obtain increased device lifetime.

Instant Invention Example 3

Figure 15:
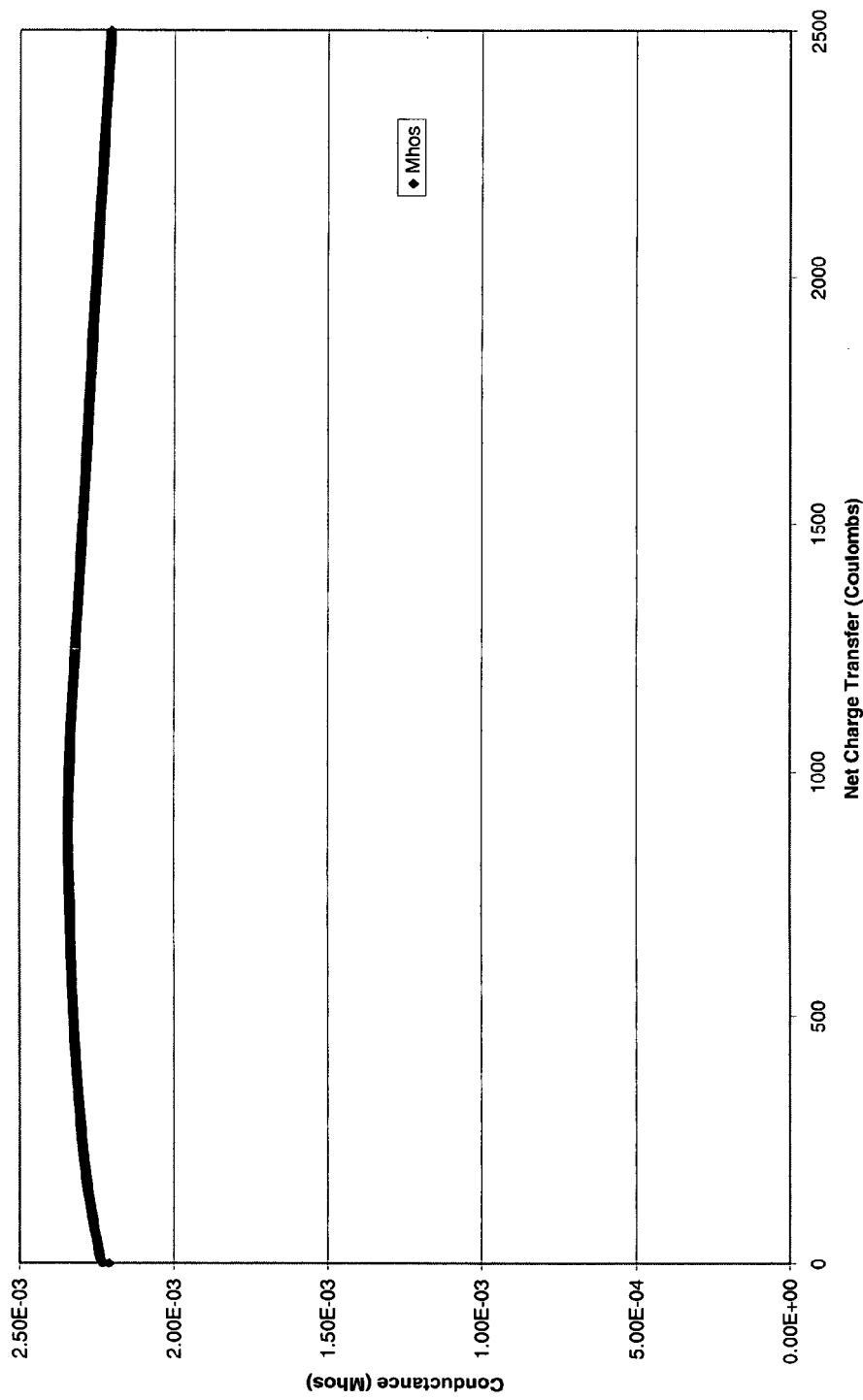
FIG. 15. Shows, based on the results of Instant Invention Example 3 below, the conductance profile as a function of total charge transfer for a multi-layer organic conductor, comprised of polythiophene and carbon nano-tubes, driven by 5 VDC with periodic reversal per the instant invention.

PEDOT/CNT Multi-Layer Conductor Driven by Reversible Direct Current Source of 5 VDC FIG. 15 shows the conductance as a function of total charge transfer for a multilayer conductive structure as taught in U.S. application Ser. No. 11/143,562, filed Jun. 2, 2005, which was subjected to a bidirectional voltage gradient created by a differential of 5 volts which was reversed at a rate of once per second. The observed conductance is substantially more stable when compared to the Comparative Example of similar material and is comparable to the performance of ITO over the test duration.

The invention has been described in detail with particular reference to certain preferred embodiments thereof, but it will be understood that variations and modifications can be effected within the spirit and scope of the invention.

| PARTS LIST | |
|---|---|
| 100 | prior art resistive-type touch screen |
| 110 | touch side electrode |
| 120 | device side electrode |
| 30 | dielectric spacers |
| 141 | touch side bus bar |
| 142 | touch side bus bar |
| 143 | touch side connector electrode |
| 144 | touch side connector electrode |
| 145 | touch side wiring pattern |
| 146 | touch side wiring pattern |
| 251 | device side bus bars |
| 252 | device side bus bar |
| 253 | device side connector electrode |
| 254 | device side connector electrode |
| 255 | device side wiring pattern |
| 256 | device side wiring pattern |
| 40 | bonding adhesive |
| 301 | horizontal sense logic driven switch element |
| 302 | vertical sense logic driven switch element |
| 303 | logic driven Forward bias switch element |
| 304 | logic driven Reverse bias switch element |
| 305 | interconnecting bus bar |
| 306 | non-polarized electrical load |
| 307 | direct current voltage supply |
| 308 | logic controlled double pole - double throw switch element |
| 309 | polarized electrical load |
| 311 | horizontal sense logic driven switch element |
| 312 | vertical sense logic driven switch element |
| 313 | combined horizontal and vertical mode switching elements |
| 401 | conductive layer |
| 402 | flexible or rigid substrate |
| 403 | insulating fixture base |
| 404 | parallel line contact test electrode |
| 405 | Keithley 2400 Source-Meter |

The invention claimed is:

1. A method of extending the life of thiophene containing conductive polymer in a device comprising
    providing a device including a conductive polymer, the device further including at least first and second connector electrodes in direct electrical contact with the conductive polymer;
    applying a voltage between the first and second electrodes to establish a voltage gradient across the conductive polymer;
    passing direct current through the conductive polymer; and
    reversing the voltage gradient across the conductive polymer, wherein the life of the thiophene containing conductive polymer is extended.

2. The method of claim 1 wherein said conductive polymer comprises polyethylenedioxythiophene.

3. The method of claim 1 wherein reversing the voltage gradient is carried out such that the time in each direction is substantially equal.

4. The method of claim 1 wherein reversing the voltage gradient is carried out prior to deterioration of conductive polymer properties.

5. The method of claim 1 wherein reversing the voltage gradient is carried out after each use of the conductive polymer.

6. The method of claim 1 wherein reversing the voltage gradient is carried out by use of an H-bridge or extended bridge configuration.

7. The method of claim 1 wherein said device comprises a touch screen.

8. The method of claim 1 wherein said device comprises a heater.

9. The method of claim 1 wherein said device comprises a bus bar.

10. The method of claim 1 wherein said reversing the voltage gradient is controlled to mitigate the deterioration of the conductive polymer.

11. The method of claim 1 wherein said reversing the voltage gradient is carried out by split rail supply.

12. An article comprising a device including a conductive polymer, the device further including at least first and second connector electrodes in direct electrical contact with conductive polymer switching elements to apply a voltage between the first and second electrodes to establish a voltage gradient across the conductive polymer and pass direct current through the conductive polymer, and to reverse the voltage gradient across the conductive polymer, wherein the life of the device is extended and wherein the switching elements reverse the voltage gradient after each use of the conductive polymer.

13. The article of claim 12 wherein said conductive polymer comprises polyethylenedioxythiophene.

14. The article of claim 12 wherein the switching elements provide that the voltage gradient applied to said article is reversed such that the time in each direction is substantially equal.

15. The article of claim 12 wherein the switching elements provide that the voltage gradient is reversed prior to deterioration of conductive polymer properties.

16. The article of claim 12 wherein the switching elements comprise an H-bridge or extended bridge configuration.

17. The article of claim 12 wherein said article comprises a touch screen.

18. The article of claim 12 wherein said article comprises a bus bar.

19. The article of claim 12 wherein said switching elements are utilized with a split rail supply.

20. The method of claim 12 wherein the polymer is a thiophene conducting polymer.

21. A touch screen comprising a conductive polymer, the touch screen further including at least first and second connector electrodes in direct electrical contact with conductive polymer switching elements to apply a voltage between the first and second electrodes to establish a voltage gradient across the conductive polymer and pass direct current through the conductive polymer, and to reverse the voltage gradient across the conductive polymer, wherein reversing the voltage gradient causes an increase in the life of the device.

22. The touch screen of claim 21 wherein both electrodes of said touch screen comprise conductive polymer.

23. The touch screen of claim 21 wherein said touch screen comprises a resistive touch screen.

24. The touch screen of claim 21 wherein the polymer is a thiophene conducting polymer.

25. A method of extending the life of thiophene containing conductive polymer in a device comprising
   providing a device including a conductive polymer, the device further including at least first and second connector electrodes in direct electrical contact with the conductive polymer;
   applying a voltage between the first and second electrodes to establish a voltage gradient across the conductive polymer;
   passing direct current through the conductive polymer in a first direction; and
   reversing the voltage gradient across the conductive polymer thereby passing direct current in a second direction opposite the first direction, wherein the life of the thiophene containing conductive polymer is extended.

26. The method of claim 25 wherein reversing the voltage gradient is carried out such that the time in each direction is substantially equal.

27. The method of claim 25 wherein reversing the voltage gradient is carried out after each use of the conductive polymer.

* * * * *